United States Patent [19]

Goto et al.

[11] Patent Number: 5,508,863
[45] Date of Patent: Apr. 16, 1996

[54] FLYING-TYPE MAGNETIC HEAD COMPRISING A SLIDER/GIMBAL CONNECTION WHICH SUPPRESSES SLIDER HEIGHT DIFFERENCES

[75] Inventors: Ryo Goto, Mooka; Chiharu Mitsumata, Gunma, both of Japan

[73] Assignee: Hitachi Metals, Ltd., Tokyo, Japan

[21] Appl. No.: 282,266

[22] Filed: Jul. 29, 1994

Related U.S. Application Data

[63] Continuation-in-part of Ser. No. 866,475, Apr. 10, 1992, abandoned.

[30] Foreign Application Priority Data

Apr. 10, 1991 [JP] Japan .................................. 3-104755

[51] Int. Cl.⁶ ............................ G11B 5/60; G11B 17/32; G11B 5/187
[52] U.S. Cl. ........................ 360/104; 360/103; 360/122
[58] Field of Search ............................ 360/103, 122, 360/104

[56] References Cited

U.S. PATENT DOCUMENTS

| | | | |
|---|---|---|---|
| 4,805,059 | 2/1989 | Tsuchiya et al. | 360/103 |
| 4,855,852 | 8/1989 | Okita | 360/104 |
| 4,918,556 | 4/1990 | Ezaki et al. | 360/103 |
| 5,008,767 | 4/1991 | Iwata et al. | 360/103 |
| 5,079,659 | 1/1992 | Hager | 360/104 |
| 5,081,553 | 1/1992 | Wanlass et al. | 360/103 |
| 5,247,415 | 9/1993 | Kumasaka et al. | 360/119 |

FOREIGN PATENT DOCUMENTS

| | | | |
|---|---|---|---|
| 0377462 | 7/1990 | European Pat. Off. . | |
| 0425916 | 5/1991 | European Pat. Off. . | |
| 61-184712 | 8/1886 | Japan . | |
| 54-001011 | 6/1979 | Japan | 360/103 |
| 58-189869 | 11/1983 | Japan | 360/103 |
| 60-182574 | 9/1985 | Japan | 360/103 |
| 62-166934 | 7/1987 | Japan | 360/103 |
| 63-098808 | 4/1988 | Japan | 360/103 |
| 1-076418 | 3/1989 | Japan | 360/103 |
| 2-054417 | 2/1990 | Japan | 360/103 |
| 2-108291 | 4/1990 | Japan | 360/103 |
| 3-127389 | 5/1991 | Japan | 360/103 |

OTHER PUBLICATIONS

"Control of Slider Aerodynamics in Disk Files", Nystgrom et al., IBM Technical Disclosure Bulletin, vol. 12, No. 8, p. 1232, Jan. 1970.
"Flexible Magnetic Head Slider", IBM Technical Disclosure Bulletin, vol. 30, No. 8, p. 472, Jan. 1988.
"Capacitive Measurements of Ferrite Head Air Bearing Surface", IBM Technical Disclosure Bulletin, vol. 33, No. 9, pp. 172–173, Feb. 1991.
"Floating Type Composite Head", Hitoshi et al., Japanese Publication No. 01-189020, pp. 1,3,5,7–9,11,13,15, and 17, plus English Abstract, 28 Jul. 1989.

Primary Examiner—Robert S. Tupper
Assistant Examiner—Craig A. Renner
Attorney, Agent, or Firm—Staas & Halsey

[57] ABSTRACT

A flying-type magnetic head includes a magnetic head chip composed of a pair of cores, each having a metallic magnetic thin film thereon which faces a magnetic gap. The magnetic chip is inserted and fixed in a slit provided in a non-magnetic slider at the outlet side of a magnetic recording medium generating airflow across an air bearing. The back of the slider is fixed to a gimbal in such a manner that a flying plane portion of the magnetic head faces the magnetic recording medium. The height at the flying plane portion of the slider is structurally controlled such that the height where the back of the slider is fixed to the gimbal differs by 20 nm or less with respect to the height thereof when the back of the slider is not fixed to the gimbal. The magnetic head chip may be composed of a pair of non-magnetic cores, each of which has a metallic magnetic thin film deposited thereon.

3 Claims, 6 Drawing Sheets

FLYING-TYPE MAGNETIC HEAD COMPRISING A SLIDER/GIMBAL CONNECTION WHICH SUPPRESSES SLIDER HEIGHT DIFFERENCES

The present application is a continuation-in-part application of prior application Ser. No. 07/866,475, filed Apr. 10, 1992, now abandoned the entirety of which prior application is hereby specifically incorporated herein by reference.

BACKGROUND OF THE INVENTION

1. Field of the Invention

The present invention relates to a flying-type magnetic head which faces a magnetic recording medium, and uses a slider, the back of which is fixed and adhered to a gimbal.

2. Description of the Related Art

Figure 6:
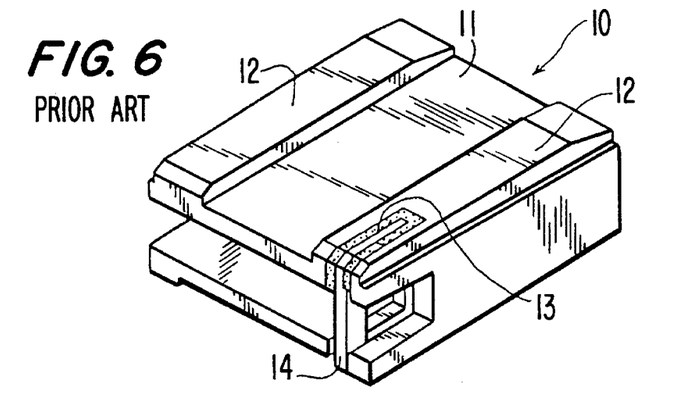
FIG. 6 is a perspective view of a conventional magnetic head.
Figure 8:
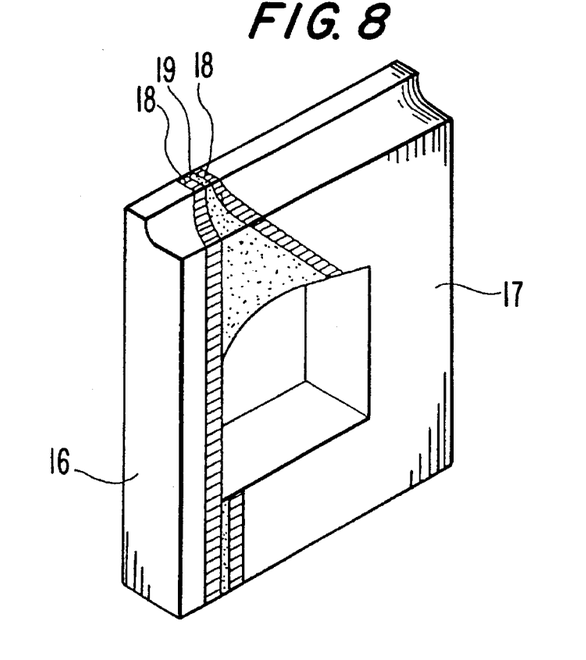
FIG. 8 is a perspective view of a magnetic head chip the core of which is made wholly of a single crystal of Mn—Zn ferrite.

Referring to FIG. 6, an example of a known composite flying-type magnetic head 10 is shown. The known composite flying-type magnetic head 10 includes a slider 11 having, along a longitudinal direction thereof, a slit 13 at the outlet of an air flow flowing along the plane of an air bearing surface 12. A magnetic head chip 14 is inserted and fixed in slit 13. An example of a magnetic head chip 14 is illustrated in FIG. 8. The magnetic head chip 14, as shown in FIG. 8, comprises a pair of adjacent cores 16 and 17, each made from a single crystal Mn—Zn ferrite, and having incorporated therebetween a metallic magnetic thin film 18 and a glass-filled magnetic gap 19. Information is read or recorded by a magnetic change generated in the gap 19. An Fe—Al—Si based magnetic thin film is deposited on the magnetic head chip 14 as the metallic magnetic thin film 18. It is also well known that at least a partial use of a single crystal Mn—Zn ferrite in the magnetic circuit improves the playback efficiency of the magnetic head chip.

Figure 7:
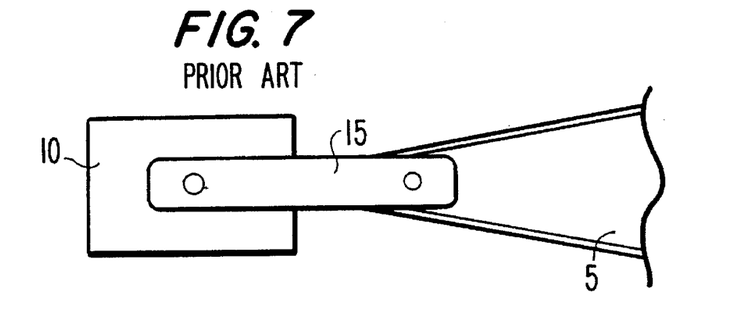
FIG. 7 is a partial view of a portion of a conventional magnetic head by which the head is fixed to a gimbal.

In order to read information from a magnetic recording medium and in order to record information to the same using a magnetic head, the gap of the magnetic head must face against the magnetic recording medium in such a manner that a very short distance is maintained therebetween. Accordingly, as shown in FIG. 7, the magnetic head 10 is fixed and adhered by the back of the slider to gimbal 15.

Because of an increasing demand for higher density, recordings are more frequently made in the high frequency regions. As a result, problems have occurred, such as resonance with the recording and playback frequencies, even at inductance levels where problems have not previously been encountered. Such resonance causes an increase in noise and a lowering of the magnetic head characteristics.

Figure 10:
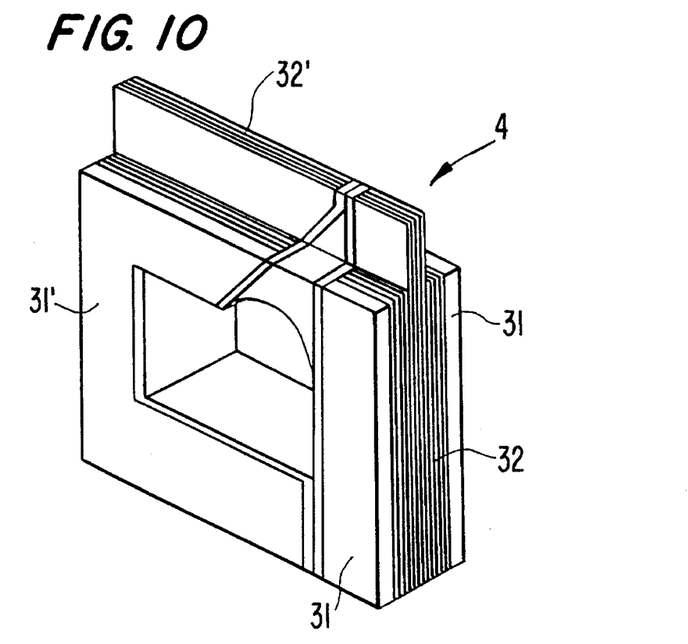
FIG. 10 is a perspective view of a magnetic head chip comprising non-magnetic cores, having incorporated therebetween a layered film including a metallic magnetic thin film and a non-magnetic film.
Figure 11:
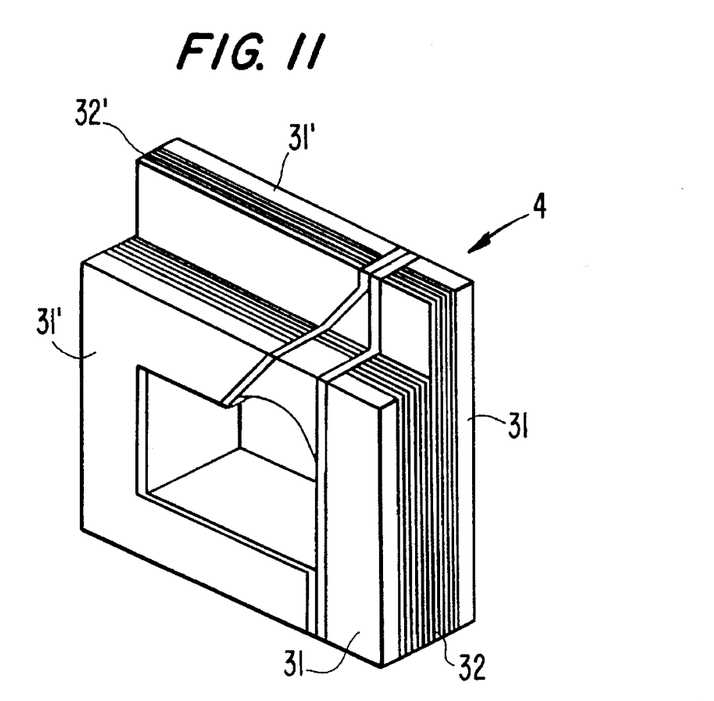
FIG. 11 is a perspective view of a magnetic head chip differing in construction from that shown in FIG. 10.

To cope with the aforementioned problems, another type of flying-type composite magnetic head has also been studied. A magnetic head of this type comprises a core made of a non-magnetic substrate material such as of MnO or NiO, and a magnetic head chip held in a slit provided in the slider. The magnetic head chip has a magnetic circuit in the layered film of a metallic magnetic thin film and a non-magnetic film. As illustrated in FIGS. 10 and 11, the magnetic head chip comprises cores 31 and 31' made of a non-magnetic substrate, such as a ceramic material, and to the sides of the non-magnetic substrates are deposited magnetic metallic thin films 32 and 32', or layered films composed of metallic magnetic thin films and non-magnetic films. The resulting structure is such that a metallic magnetic thin film 32 or 32' or a layered film thereof with a non-magnetic film, is sandwiched between non-magnetic substrate materials. Because such magnetic heads must be suitably used for narrower tracks which require higher precision, the metallic magnetic thin films and the layered films are subjected to drawing for tracks to bury them in the slit of the air bearing, and then fixed using a molding glass. The magnetic head chip shown in FIG. 10 is track-drawn at the center portion near to the gap, whereas the chip shown in FIG. 11 comprises cores 31 and 31', wherein one of the sides is drawn for tracks.

SUMMARY OF THE INVENTION

The flying-type magnetic heads described above are operated with the slider plane levitated from the surface of a magnetic recording medium at a height of about 0.1 uV. Accordingly, the back of the magnetic head slider is fixed and adhered to a gimbal in order to maintain the magnetic head levitated from the surface of a magnetic recording medium. However, degradation of the write characteristics of the magnetic head have occurred at times as a result of the conditions under which the slider is bonded to the gimbal in order to effect a tight adhesion therebetween.

Figure 1:
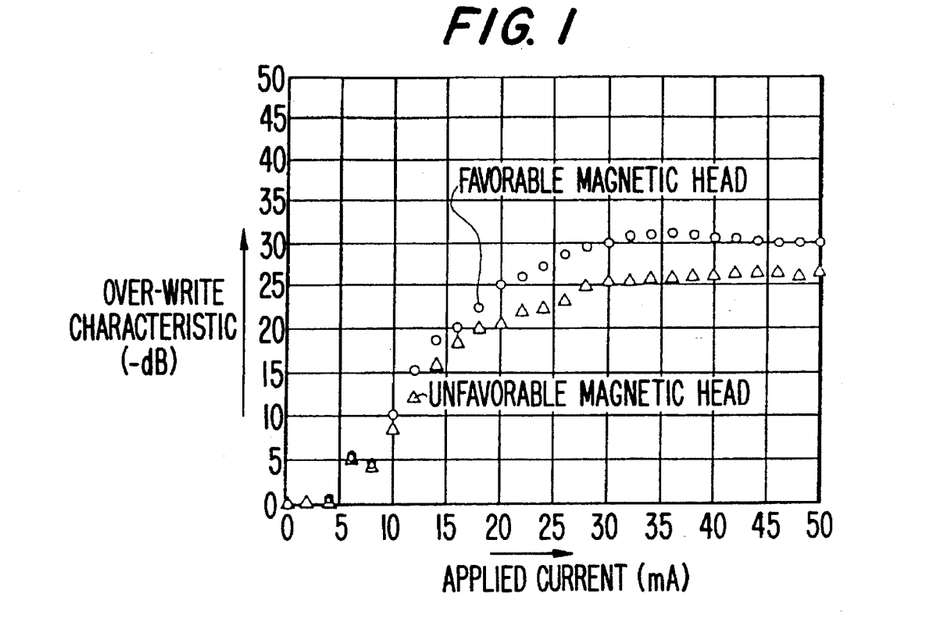
FIG. 1 is a graph showing the over-write characteristic curve of magnetic heads.

More specifically, even when the same magnetic head chips were used to fabricate magnetic heads, the write characteristics of the magnetic heads which result after fixing the sliders to gimbals are quite different from those which occurred before fixing the sliders to the gimbals; some come out with satisfactory write characteristics and others show unfavorable characteristics. This can be seen by over-writing a magnetic recording media using the magnetic heads, and by comparing the over-write characteristics (the ratio of the residual signal of the previous recording to the newly recorded signal on a magnetic recording medium) thereof, as is shown in FIG. 1.

Figure 2:
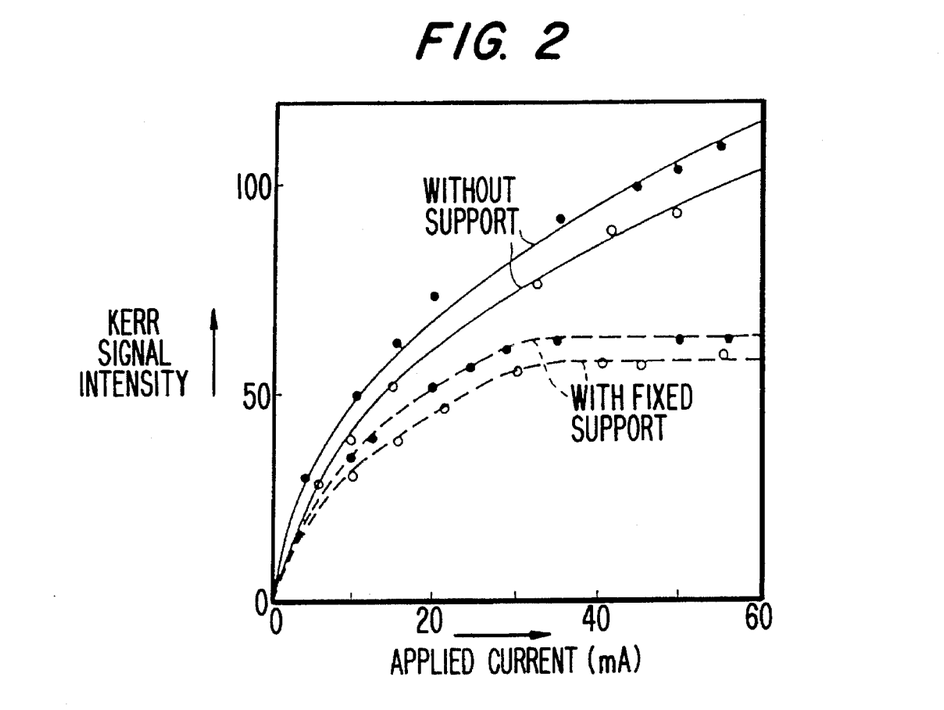
FIG. 2 is a graph showing the Kerr signal intensity curve of metallic magnetic thin films of magnetic heads.

The Kerr signal intensities with changing applied current were measured on the metallic magnetic thin film of a magnetic head which exhibited poor playback efficiency upon fixing it to a gimbal. The measurement was made on the metallic thin films with the slider both fixed and unfixed to the gimbal, using a scanning Kerr effect measurement apparatus (referred to hereinafter as SKEM). The results are shown in FIG. 2. It can be seen that, even when the metallic magnetic thin films have favorable characteristics when they are not fixed to the gimbal, the write characteristics become impaired once they are fixed on gimbals. This is clear evidence which shows that fixing a metallic magnetic thin film to a gimbal impairs the write characteristics thereof.

The present inventors have studied extensively the reasons why some magnetic heads show poor write characteristics when they are fixed to a gimbal while the others do not. As a result of these studies, it has been found that the conditions upon fixing the magnetic head to a gimbal greatly change the height of the rigged flying plane of the slider of the magnetic head and hence change the write characteristics of the magnetic head. Furthermore, the over-write characteristics become impaired with increasing change in the height of the rigged flying plane of the slider.

The present inventors measured the heights of the rigged flying planes of the sliders on the magnetic heads fixed to gimbals, for both those having favorable characteristics and those having poor characteristics. It has been found that the difference in the height of the rigged flying plane of the slider was as small as 20 nm or less for those having favorable write characteristics, whereas those having poor characteristics exhibited a large difference of from 25 to 70 nm. Thus, it has been assumed that the stress to the magnetic head chip becomes larger with an increasing difference between the heights of the rigged flying plane of the slider with and without the slider being adhered to the gimbal. The result of the stress on the magnetic head chip is that there occurs a reversed magnetostrictive phenomenon in which the magnetized state achieves a different state from that of the initial unmounted head chip. Conclusively, it has been thought that the generation of a reversed magnetostriction deteriorates the characteristics of the metallic magnetic thin film to lower the magnetic flux density, and that the over-write characteristics are thereby impaired.

It is therefore an object of the present invention to overcome the problems mentioned above, and to provide a flying-type magnetic head based on the above described findings of the present inventors. More specifically, the present invention provides a magnetic head, the slider of which is adhered by its back to a gimbal, with the height of the rigged flying plane of the slider being controlled such that it may be different by 20 nm or less from the height with the slider not adhered by its back to a gimbal. The difference in height of the rigged flying plane of the slider must be controlled to 20 nm or less, otherwise favorable over-write characteristic will not be stably achieved.

Thus, accumulation of large stresses in the magnetic head chip is avoided by controlling the height of the rigged flying plane of the slider of a magnetic head fixed to a gimbal so as to differ by 20 nm or less from the height of a head which is not adhered to a gimbal. The metallic magnetic thin film can then be maintained in a magnetized state similar to that without any gimbal fixed thereto, and hence the over-write characteristics are not impaired.

In the flying-type magnetic head mentioned above, the magnetic head chip to be established on a slider comprises a core on which the metallic magnetic thin film is to be deposited. The core may be made either wholly or partially of a single crystal of Mn—Zn ferrite. The magnetic head chip may include a non-magnetic core having deposited thereon a metallic magnetic thin film, or may include a non-magnetic core having deposited thereon a layered film including a metallic magnetic thin film and a non-magnetic film

DETAILED DESCRIPTION OF THE PREFERRED EMBODIMENTS

Now the present invention is explained in further detail referring to non-limiting examples below.

EXAMPLE 1

Figure 3A:
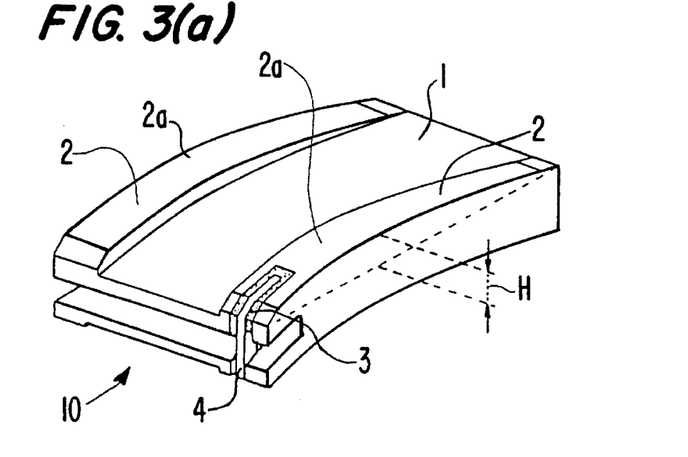
FIG. 3(a) is a schematic drawing of the flying plane of a flying-type magnetic head for explanatory purposes.
Figure 3B:
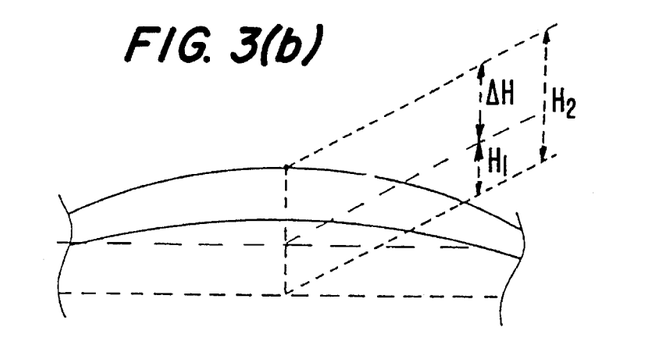
FIG. 3(b) is an explanatory drawing to show the difference in height of the rigged plane of a flying slider.
Figure 4A:
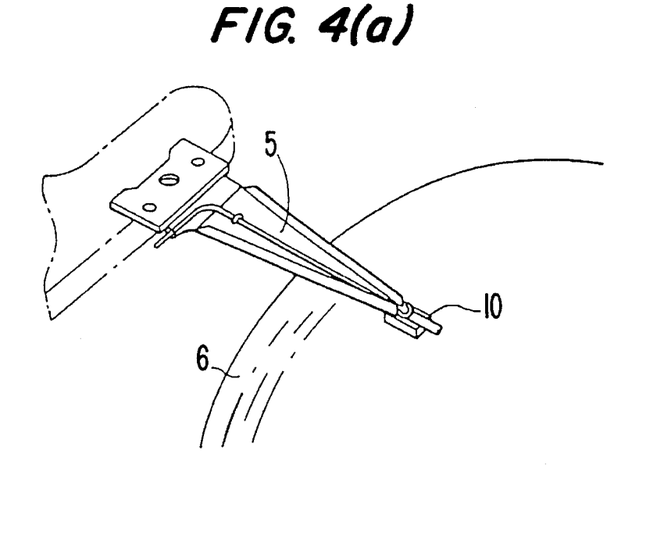
FIG. 4(a) is a perspective view of a flying-type magnetic head fixed to a gimbal.
Figure 4B:
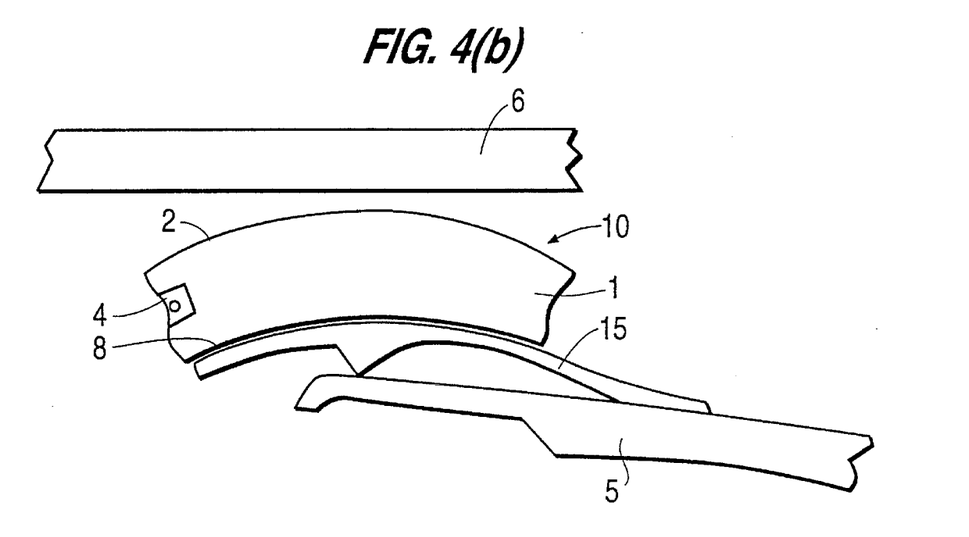
FIG. 4(b) is a side view of the flying-type magnetic head fixed to the gimbal shown in FIG. 4(a)

Referring to FIGS. 3 and 4, a flying type magnetic head 10 according to the present invention is explained. Cores 16 and 17 used in the magnetic head chip 4 of a non-magnetic slider 1 of the magnetic head 10 are made wholly from a single crystal of Mn—Zn ferrite as shown in FIG. 8. The magnetic head chip 4, thus comprises a metallic magnetic thin film 18 incorporated in the vicinity of a magnetic gap 19 between the cores 16 and 17. The magnetic head chip 4 is inserted and fixed in a slit 3 provided on the slider 1 at the discharge side of an air bearing through which a magnetic recording medium is discharged. The back of the slider 1 is fixed to a gimbal 15 of an elastic support 5 with an adhesive in such a manner that the flying plane 2 of the slider 1 faces the magnetic recording medium 6. The slider 1 becomes levitated from the magnetic recording medium 6 by a minute distance with the rotation of the magnetic recording medium 6, so that the magnetic information which is generated at the gap portion of the magnetic head chip 4 may be recorded on the magnetic recording medium 6, or conversely, information may be read from the magnetic recording medium 6 at the magnetic gap portion.

The flying plane 2 of the slider 1 comprises a rigged flying plane portion 2a as shown in FIG. 3(a). The height H of said rigged portion 2a is controlled such that the difference in the height thereof between the states of fixing and without fixing the slider 1 to the gimbal 15 is 20 nm or less. More specifically, as shown in FIG. 3(b), the height, $H_1$, of the rigged portion 2(a) where the slider 1 is not fixed to the gimbal 15 changes to $H_2$ where the slider is fixed to the gimbal 15, yielding a difference in height of ΔH. The difference in height of the rigged flying plane when the slider 1 is fixed to the gimbal, as opposed to when the slider 1 is not fixed to the gimbal, is caused by stresses due to the adhering process which result in bowing of the rigged flying plane 2a of the slider 1. To control the height H of the rigged portion to 20 nm or less, the back of the slider 1 was adhered to the gimbal with care so as to avoid unnecessary deformation on the flying plane of the slider. The height H of the rigged flying plane of the slider 1 was measured before adhering the back of the slider 1 to the gimbal 15, and the height H of the rigged flying plane of the slider was measured again after adhesion, to select only those heads having a difference in height of 20 nm or less before and after the adhesion.

A magnetic head 10 is prepared by adhering with glue 8 (for example a thermal-hardening resin), the back of a slider 1 to a gimbal 15 provided on an elastic support 5 as shown in FIG. 4(*b*).

When the slider is adhered to the gimbal with thermal-hardening resin, the resin is heated from 30° C. to about 120° C. The slider is formed with titanic acid calcium, and the gimbal and the elastic support are formed with SUS304. The thermal expansion coefficients of the slider and the gimbal are $115 \times 10^{-7}$/° C. and $173 \times 10^{-7}$/° C. respectively, so that the slider becomes bowed like a bimetal element as shown in FIG. 4(*b*). The bowing of the slider leads to, one after another, a stress of the magnetic core, impairment of a magnetic character by the magnetic strain, impairment of the magnetic permeability, impairment of magnetic field in a gap of magnetic head, did lastly impairment of the over write characteristics.

Figure 12:
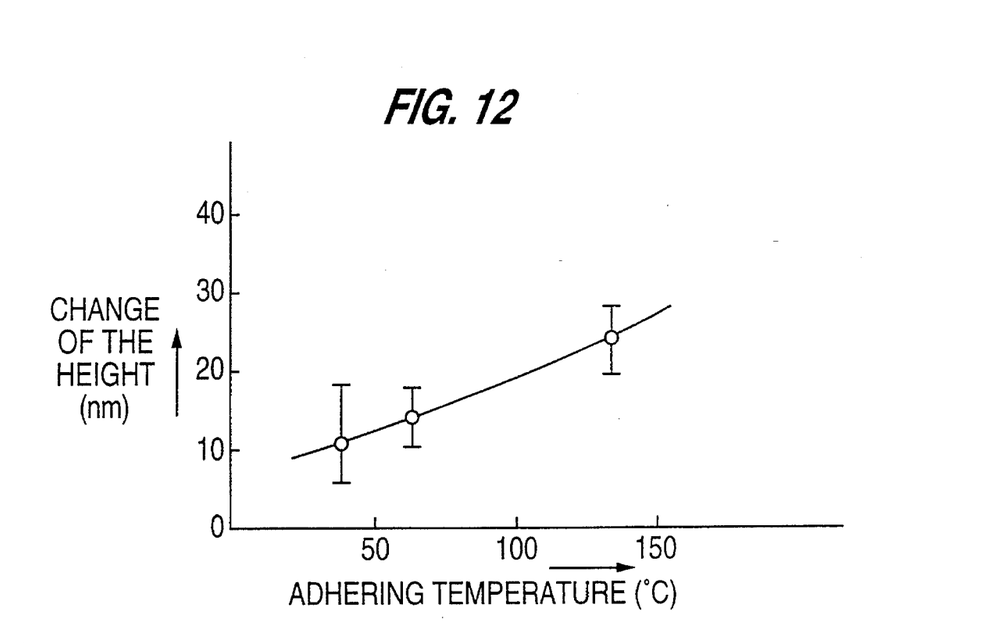
FIG. 12 is a graph showing change of height of the rigged flying plane versus thermal-hardening temperature of resin.

The amount of bowing of the slider is related to the temperature and time that it takes for the thermal-setting resin to harden during the adhering process, for example, 120° C. ×10 minutes, 60° C.×10 hours, 30° C.×80 hours. The relationship between the hardening temperature and the change of the height of the rigged plane of the slider is shown in FIG. 12. The result is, that when the adhering temperature is 80° C. or less, the change of the height is less than 20 nm. Therefore, it is desirable that the adhering temperature is at 80° C. or less for adhering the slider on the gimbal with the thermal-hardening resin.

Figure 5:
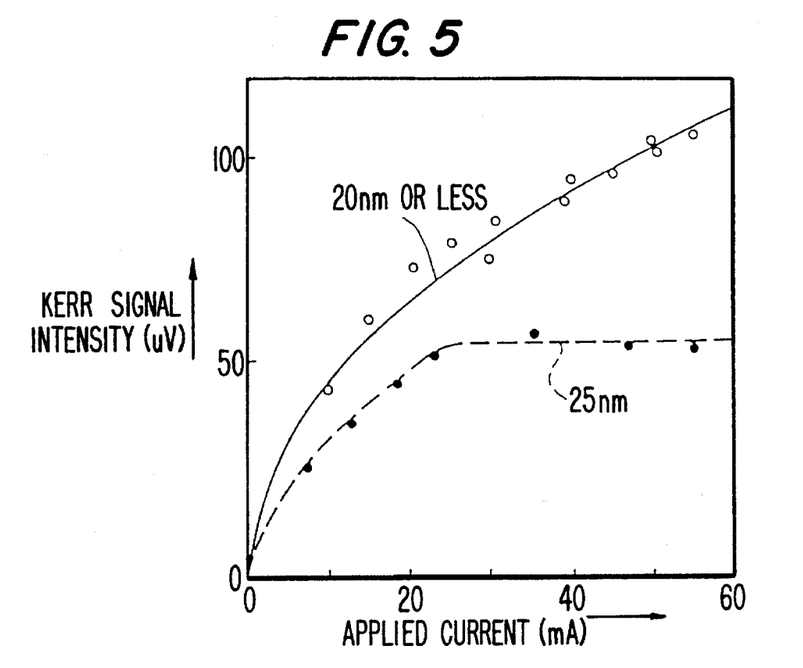
FIG. 5 is a graph showing the Kerr signal intensity curve of metallic magnetic thin films of flying-type magnetic heads.

In the foregoing manner, magnetic heads adhered to a gimbal and having a change in height of the rigged flying plane 2a of 20 nm or less were obtained. The Kerr signal intensity (uV) was measured using an SKEM on each of the magnetic heads thus obtained at respective applied currents. The results are shown in FIG. 5. FIG. 5 also shows the Kerr signal intensity for unfavorable magnetic heads which yielded a difference in the height at the rigged portion 2a of the flying plane of 25 nm. It can be confirmed from FIG. 5 that the magnetic heads having a height difference of the rigged portion 2a of 20 nm or less yield favorably a signal intensity increasing in proportion to the applied current, whereas those having a height difference of the rigged portion 2a of 25 nm became saturated at an applied current of about 20 mA.

Figure 9:
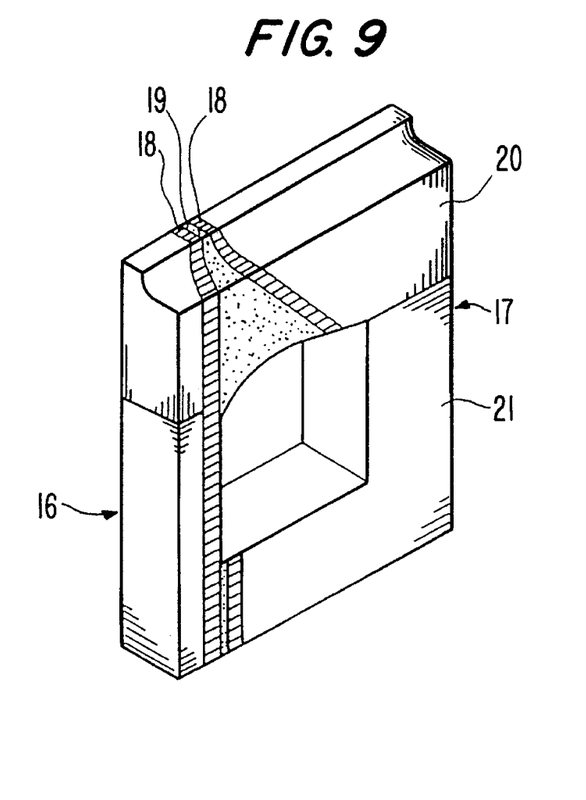
FIG. 9 is a perspective view of a magnetic head chip the core of which is made partially of a single crystal of Mn—Zn ferrite.

In the foregoing Example, the core which establishes the magnetic circuit of the magnetic head chip 4 was wholly constructed from a single crystal Mn—Zn ferrite. A similar result was obtained, however, with a magnetic chip 4 as shown in FIG. 9, having a core comprising single crystal Mn—Zn ferrite only at the vicinity 20 of the gap of the cores 16 and 17, with the remainder of the core 21 being made of a polycrystalline Mn—Zn ferrite.

The same effect as discussed above can be obtained with a magnetic head chip 4 comprising non-magnetic cores 31 and 31' having deposited thereon metallic magnetic thin films 32 and 32', or such comprising cores 31 and 31' having deposited layered films 32 and 32' each composed of a metallic magnetic thin film and a non-magnetic film, as shown in the foregoing FIGS. 10 and 11. Furthermore, a plurality of cores may be used to sandwich a metallic magnetic thin film or a layered film. It is also effective to use a core having a non-magnetic protective film coated thereon in the place of a core of the pair of cores shown in FIGS. 10 and 11.

As described above, the present invention provides a flying-type magnetic head having an excellent over-write characteristic, because the magnetic head chip is free from stresses and hence free from being unfavorably influenced in magnetization. This is achieved by controlling the bowed height of the rigged flying plane of the slider which is adhered to a gimbal at a difference of 20 nm or less from the height of the bowed flying rigged plane when the slider is not adhered to the gimbal.

EXAMPLE 2

A flying magnetic head was fabricated in the same manner as in Example 1, except a magnetic head chip was used having deposited thereon a metallic magnetic thin film and having a magnetic circuit which is at least partially constructed by a single crystal of Mn—Zn ferrite. The magnetic head was inserted and fixed in a slit provided on a non-magnetic slider at the discharge side of an air bearing through which a magnetic recording medium is discharged. The back of the slider was fixed to a gimbal in such a manner that the flying plane of the slider faces the magnetic recording medium. The magnetic heads thus obtained were evaluated as follows. The height of the rigged flying plane of the slider was measured before adhering the back of the slider to the gimbal, and the height of the rigged flying plane of the slider was measured again after adhesion, so as to select, as favorable heads, only those heads having a difference in height of 20 nm or less before and after the adhesion. As a result, it was found that the heads evaluated as favorable ones exhibited excellent over-write characteristics, whereas those evaluated as being unfavorable yielded poor over-write characteristics.

While the invention has been described in detail and with reference to specific embodiments thereof, it will be apparent to one skilled in the art that various changes and modifications can be made therein without departing from the spirit and scope thereof.

We claim:

1. A flying-type magnetic head comprising:

a non-magnetic slider formed from titanic acid calcium, said slider including a bearing surface and a back surface and having, along a longitudinal direction thereof, a slit at an outlet side of an air flow across said bearing surface of said slider;

a magnetic head chip inserted and fixed in said slit, said magnetic head chip including a pair of cores having surfaces which face each other and form a magnetic gap;

a gimbal formed from SUS305 provided on an elastic support, the back surface of said slider being affixed to said gimbal so as to present a rigged flying plane portion of said slider at said bearing surface thereof, said flying plane portion being disposed so as to face a recording medium, said slider being adhered to said gimbal using a thermal-hardened resin heated and hardened at 80° C. or less thereby suppressing differences in the height of said rigged flying plane portion before and after mounting of said slider on the gimbal relative to an initial position of said back surface before mounting of the slider on the gimbal, so that said differences in the height before and after said slider is fixed to the gimbal are no more than 20 nm.

2. The flying-type magnetic head as claimed in claim 1, wherein said cores are each made from a single crystal Mn—Zn ferrite, and a metallic magnetic thin film is formed on at least one of the surfaces which form the magnetic gap.

3. The flying-type magnetic head as claimed in claim 1, wherein said cores are each non-magnetic cores, and each said core includes a metallic magnetic thin film on the surfaces thereof which form the magnetic gap.

* * * * *

UNITED STATES PATENT AND TRADEMARK OFFICE
CERTIFICATE OF CORRECTION

PATENT NO. : 5,508,863
DATED : April 16, 1996
INVENTOR(S) : Ryo GOTO et al.

It is certified that error appears in the above-indentified patent and that said Letters Patent is hereby corrected as shown below:

Title Page, Column 2, under OTHER PUBLICATIONS, line 1, delete "Nystgrom" and substitute --Nystrom--.

Signed and Sealed this

Twenty-seventh Day of August, 1996

Attest:

BRUCE LEHMAN

*Attesting Officer*      *Commissioner of Patents and Trademarks*